(12) United States Patent
Dunlap

(10) Patent No.: US 7,567,858 B1
(45) Date of Patent: Jul. 28, 2009

(54) IRRIGATION TRACKING AND CONTROL SYSTEM

(76) Inventor: Bryan R. Dunlap, P.O. Box 391, Newman Grove, NE (US) 68758

( * ) Notice: Subject to any disclaimer, the term of this patent is extended or adjusted under 35 U.S.C. 154(b) by 690 days.

(21) Appl. No.: 11/335,256

(22) Filed: Jan. 19, 2006

Related U.S. Application Data

(60) Provisional application No. 60/645,946, filed on Jan. 24, 2005.

(51) Int. Cl.
*G06F 19/00* (2006.01)
(52) U.S. Cl. .......................... 700/284; 239/67
(58) Field of Classification Search ................. 700/284; 705/1; 239/6, 69; 702/3
See application file for complete search history.

(56) References Cited

U.S. PATENT DOCUMENTS

| | | | | |
|---|---|---|---|---|
| 5,927,603 A * | 7/1999 | McNabb | ...................... | 239/63 |
| 2004/0044493 A1* | 3/2004 | Coulthard | .................... | 702/122 |
| 2006/0027677 A1* | 2/2006 | Abts | ........................... | 239/67 |
| 2007/0106527 A1* | 5/2007 | McKinney | ..................... | 705/1 |
| 2007/0293990 A1* | 12/2007 | Alexanain | ................... | 700/284 |

* cited by examiner

*Primary Examiner*—Kidest Bahta

(57) ABSTRACT

An irrigation tracking and control system includes a control module attached an irrigation system, with a GPS receiver in the module for tracking movement of the distal end of the irrigation system. A microprocessor in the module processes position information and status information regarding the irrigation system and transmits the same via a cellular telephone network to a web server hosting a website. The information is downloaded to the website, and predetermined consumers may access the information on the website.

4 Claims, 3 Drawing Sheets

IRRIGATION TRACKING AND CONTROL SYSTEM

CROSS-REFERENCES TO RELATED APPLICATIONS

This application claims the benefit of U.S. Provisional Application Ser. No. 60/645,946 filed Jan. 24, 2005.

STATEMENT AS TO RIGHTS TO INVENTIONS MADE UNDER FEDERALLY SPONSORED RESEARCH AND DEVELOPMENT (Not Applicable)

INCORPORATION-BY-REFERENCE OF MATERIAL SUBMITTED ON A COMPACT DISC (Not applicable)

BACKGROUND OF THE INVENTION (1) Field of the Invention

The present invention relates generally to irrigation systems, and more particularly to an improved apparatus and system for tracking the position and status of an irrigation system, and providing this information to a consumer in an easily accessed format.

(2) Description of Related Art Including Information Disclosed Under 37 CFR 1.97, 1.98

Center pivot and lateral irrigation systems are in widespread use throughout the United States and the world, to assist farmers in the growing of crops. Typically, these irrigation systems include an elongated water distribution pipe with sprinkler heads spaced therealong to broadcast water. The distribution pipe is supported on a series of wheeled towers, to enable the pipe to be moved through a field. In the case of a center pivot system, one end of the pipe is connected at a central pivot point, to broadcast the water in a generally circular pattern.

Many such irrigation systems are provided with electronic controls and a microprocessor, to operate the system and control a variety of variable parameters. For example, the application rate can be controlled, or the system may be turned on, off or reversed at period intervals.

While current systems have the ability to permit control and variation of the irrigation of fields, they do not currently allow the consumer to quickly and easily monitor the status of the system. For example, it is desirable to determine the amount of water applied on a field over a period of time, to calculate a "history" of that particular field. In addition, it would be valuable to be able to alert the consumer that the system has been shut down, or activated, without requiring the consumer to physically view the system.

BRIEF SUMMARY OF THE INVENTION

It is therefore a general object of the present invention to provide an improved irrigation tracking and control system.

A further object is to provide an irrigation tracking and control system that can alert a consumer as to the status of the system, via pager, cell phone or on a website.

Yet another object of the present invention is to provide an irritation tracking and control system that provides the consumer with an easily accessible report of the history of selected irrigation systems.

These and other objects will be apparent to those skilled in the art.

The irrigation tracking and control system of the present invention includes a control module attached to the irrigation system with a GPS receiver for tracking movement of the distal end of the irrigation system. A cellular modem in the control module is used to transmit position information at periodic intervals to a web server hosting a website. The information is downloaded to the website, and predetermined consumers may access the information on the website. A water pressure sensor detects the presence and absence of water pressure at a sprinkler head on the irrigation system or a current sensor senses current for the system to be able to move or not move, and sends a signal to a microprocessor in the control module upon the occurrence of a change of condition of the irrigation system. This signal is then transmitted via cellular modem to the website for further distribution as determined by the particular consumer. Further distribution can include transmission of an alarm via e-mail, landline telephone, or as a text message to a cell phone. The system also includes the capability of a consumer shutting down the irrigation system by entering a command on the user's computer, which is then transmitted via the website and thence the cellular phone network to the control module in the irrigation system.

BRIEF DESCRIPTION OF THE SEVERAL VIEWS OF THE DRAWING

The preferred embodiment of the invention is illustrated in the accompanying drawings, in which similar or corresponding parts are identified with the same reference numeral throughout the several views, and in which.

DETAILED DESCRIPTION OF THE INVENTION

Figure 1:
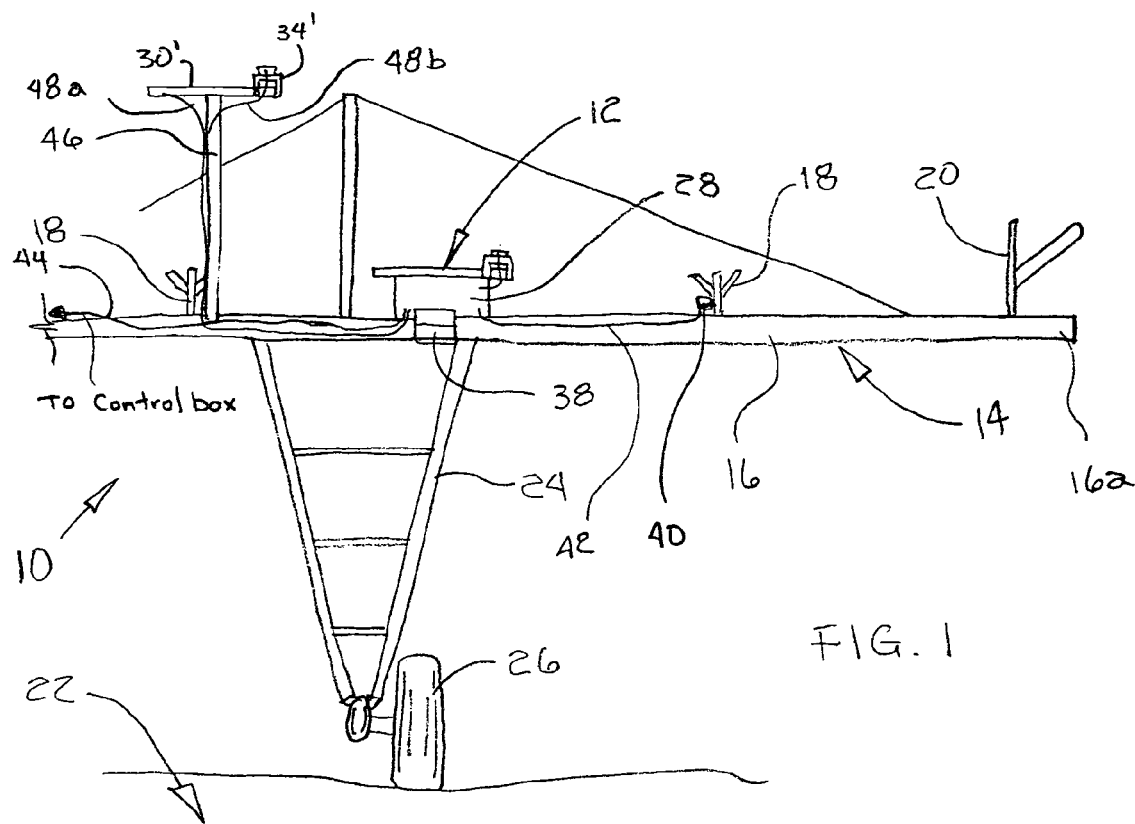
FIG. 1 is an elevational view of one end of an irrigation system, with the control module of the tracking and monitoring system of the present invention thereon.

Referring now to the drawings, and more particularly to FIG. 1, the tracking and monitoring system of the present invention is designated generally at 10, and includes a control module 12 mounted on a conventional irrigation system 14. It should be noted that irrigation system 14 may be of any conventional type, including a lateral system or a center pivot system. In the present disclosure, a center pivot will be shown and described.

Irrigation system 14 includes an elongated water distribution pipe 16 extending from a center pivot (not shown) to outward end 16a. A series of sprinkler heads 18 are mounted on pipe 16 along the length thereof, and in some cases, an end gun 20 is installed at the distal end 16a of pipe 16 to water corners and other non-circular areas of the field (designated generally at 22). A series of support towers 24 are mounted to pipe 16 and have a drive wheel 26 thereon to move pipe 16 over field 22 and distribute water in a predetermined pattern.

Figure 2:
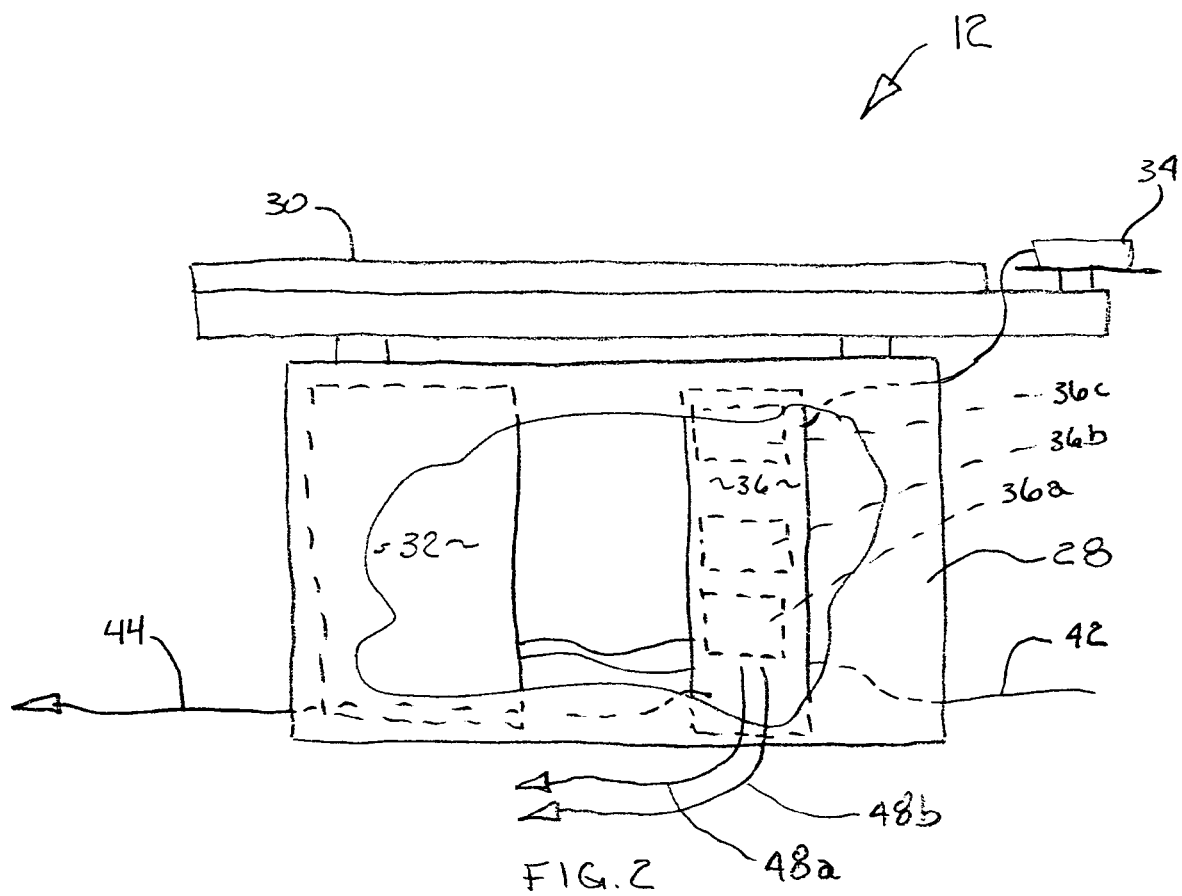
FIG. 2 is an enlarged elevational view of the control module.

Control module 12 is shown in more detail in FIG. 2, and includes a hollow housing 28 with an access opening or operable door. A solar panel 30 is mounted in a generally horizontal orientation on top of housing 28, to provide electrical power to charge a 12-Volt SLA battery 32 within housing 28. A GPS antenna and cellular telephone antenna combination 34 are mounted adjacent solar panel 30 outside housing 28, and are connected to a CPU 36 within housing 28. CPU 36 includes a microprocessor 36a, a GPS receiver 36b, and a cellular modem transceiver 36c for sending and receiving data over a cellular telephone network. CPU 36 is powered by battery 32. It should be noted that power for CPU 36 might be alternatively supplied by the irrigation system itself, rather than independently from solar panels 30.

Referring once again to FIG. 1, housing 28 of control module 12 is attached to pipe 16 proximal the distal end 16a of pipe 16. This attachment may be accomplished in a number of ways, but preferably is with a band clamp 38, which may be removed and replaced, making housing 28 removable from irrigation system 14, as desired.

A water pressure sensor 40 is mounted on irrigation system 14 in engagement with a sprinkler head 18, to detect the presence or absence of water pressure in the sprinkler head, and thereby determine the state of irrigation system 14 as "on" or "off". Sensor 40 is connected to the CPU 36 (shown in FIG. 2) via conductor 42. A wire pair 44 extends from CPU 36 and extends the length of the pipe 16 to the control box for the irrigation system (not shown) for remote relay shutdown of the irrigation system 14.

FIG. 1 shows an optional extension post 46 mounted separate but proximal to control module 12. Extension post 46 may be used to support the solar panel 30' and or GPS and cellular antenna combination 34' (instead of directly on housing 28 as shown in FIG. 2). It should be noted that, in use, if using solar power, there is only one set of solar panels 30 or 30' and antennae 34 or 34', although two are shown in the drawings. If extension post 46 is used, then the solar panel 30 and/or antennae 34 are moved from housing 28 to extension post 46. A pair of wires 48a and 48b is provided to connect the solar panel 30' and antennae set 34 to control unit 12, if post 46 is used.

Figure 3:
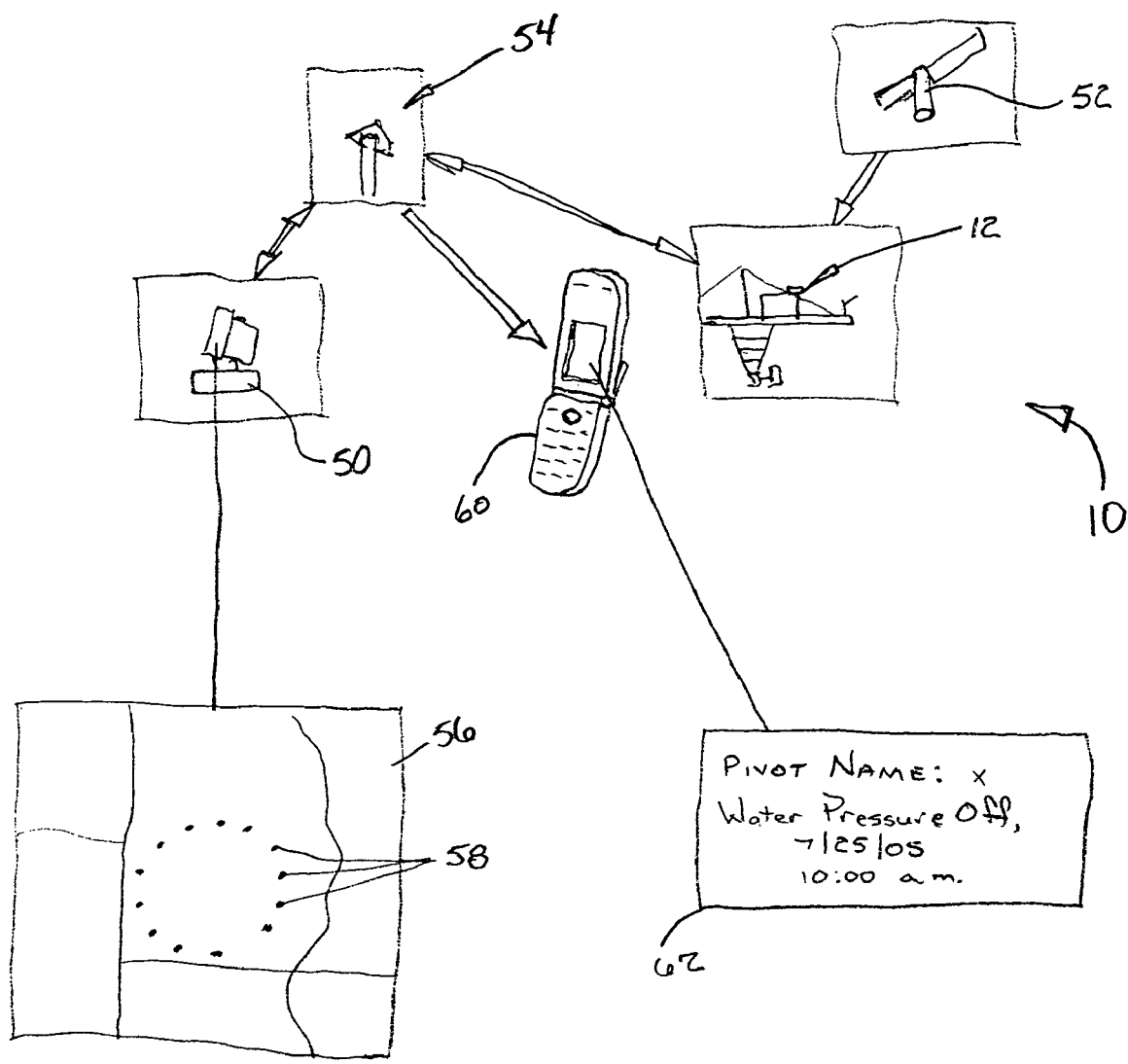
FIG. 3 is a block diagram of the tracking and monitoring system of the present invention.

Referring now to FIG. 3, a schematic diagram shows the general method of operation of the system 10. Each user of the system is provided with hardware (control module 12), which is mounted on the user's irrigation system, and software for the user's computer 50. In operation, the GPS satellites 52 send signals to the GPS receiver 36b in control module 12. This information is processed by microprocessor 36a, and the exact location of the GPS receiver is determined, thereby establishing the location towards the end of the irrigation system.

This location information is then transmitted via the cellar modem transceiver 36c to the cellular telephone network 54, which in turn transmits the data over the Internet to be loaded on a website which is accessed by the user's computer 50. Box 56 in FIG. 3 shows a screen display from the website, with a map of the field 22 in which the user's irrigation system is located. Data representing the location of the GPS receiver at periodic intervals are displayed as points 58 on the map. Additional information may also be displayed, such as the status of the irrigation system ("on" or "off") and the history of the location and status of the irrigation system. Other information, from additional sensors not discussed herein, may also be displayed.

Tracking and control system 10 is also programmed to enable an alarm to be sent to the user upon the occurrence of an event—such as the water pressure in an irrigation system being "off". The detection of such an event by a sensor on the irrigation system would cause the sensor to send a signal to the microprocessor 36a, which in turn would transmit a signal via the cellular telephone transceiver to the Internet website. The alarm is then directed by the instruction so the user: (a) to the user's computer as a screen display, (b) to the user's e-mail as an e-mail message, or (c) to the user's cell phone 60 as a text message 62.

An additional capability of the software is the ability for the user to control any of the user's irrigation systems by the sending of a command from the user's computer 50. This command is then transmitted to the website, which in turn transmits the command over the cellular telephone network 54 to the cellular modem transceiver 36c in the control module 12. The microprocessor 36a in control module 12 then sends a command to the irrigation system control box, to shut down the irrigation system 14.

Whereas the invention has been shown and described in connection with the preferred embodiments thereof, many modifications, substitutions and additions may be made which are within the intended broad scope of the appended claims.

What is claimed is:

1. A tracking and control system for an irrigation system, the irrigation system of a type having a water distribution pipe supported on a plurality of movable towers located along the pipe from a proximal end to a distal end of the pipe, the tracking and control system including:

a control module attached to the irrigation system and operable to track movement of the distal end of the irrigation system and control operation of the irrigation system;

said control module including:
  a hollow housing having a CPU therein;
  said CPU including:
    a microprocessor;
    a GPS receiver connected to the microprocessor; and
    a cellular modem transceiver connected to the microprocessor;
  a GPS antenna mounted on the irrigation system outside of the housing and connected to the GPS receiver; and
  a cellular telephone antenna mounted on the irrigation system outside of the housing and connected to the cellular transceiver;

a web server hosting a website and connected to a worldwide computer network, said website connected to the control module via cellular telephone data transmissions; and at least one user computer connected to the website via the worldwide computer network, said user computer programmed to access information downloaded to the website from the control module and display location information regarding the irrigation system upon which the control module is attached;

said CPU microprocessor being programmed to:
  periodically activate the GPS receiver and receive location information therefrom;
  process location information and convert location information from the GPS receiver into a data packet for transmission over a cellular telephone network; and
  operate said cellular modem transceiver to transmit a data packet over the worldwide computer network to the website;

said website computer being programmed to download received data packets to the website; and said user computer being programmed to display data packets accessed at the website;

said user computer further being programmed to selectively send a signal to the website to shut down a selected irrigation system;

said website computer further being programmed to process a shutdown signal from a user computer and transmit a shutdown command over the cellular network to the cellular transceiver in the control module; and said microprocessor further being programmed to receive shutdown commands from the cellular modem transceiver and send a signal to shut down the irrigation system.

2. A tracking and control system for an irrigation system, the irrigation system of a type having a water distribution pipe supported on a plurality of movable towers located along the pipe from a proximal end to a distal end of the pipe, the tracking and control system including:

a control module attached to the irrigation system and operable to track movement of the distal end of the irrigation system and control operation of the irrigation system;

said control module including:
a hollow housing having a CPU therein;
said CPU including:
a microprocessor;
a GPS receiver connected to the microprocessor; and
a cellular modem transceiver connected to the microprocessor;
a GPS antenna mounted on the irrigation system outside of the housing and connected to the GPS receiver; and
a cellular telephone antenna mounted on the irrigation system outside of the housing and connected to the cellular transceiver;

a web server hosting a website and connected to a worldwide computer network, said website connected to the control module via cellular telephone data transmissions; and at least one user computer connected to the website via the worldwide computer network, said user computer programmed to access information downloaded to the website from the control module and display location information regarding the irrigation system upon which the control module is attached;

a sensor mounted on the irrigation system operable to send a signal upon the shutdown of the irrigation system, said sensor connected to said microprocessor, and wherein said microprocessor programmed to:
process a shutdown signal from the sensor and convert the signal to an alarm signal for transmission over the cellular telephone network; and
operate said cellular modem transceiver to transmit an alarm signal over the worldwide computer network to the website;

said website computer further being programmed to download received alarm signals to the website and send an alarm message to a predetermined user upon the downloading of the alarm signal.

3. The tracking and control system of claim 2, wherein the website computer is further programmed to send an e-mail to a predetermined user upon receipt of a downloaded alarm signal.

4. The tracking and control system of claim 2, wherein the website computer is further programmed to send a text message to a predetermined user cell phone upon receipt of a downloaded alarm signal.

* * * * *